J. T. HILL.
ADJUSTABLE HARROW.
APPLICATION FILED APR. 27, 1912.
1,069,420. Patented Aug. 5, 1913.
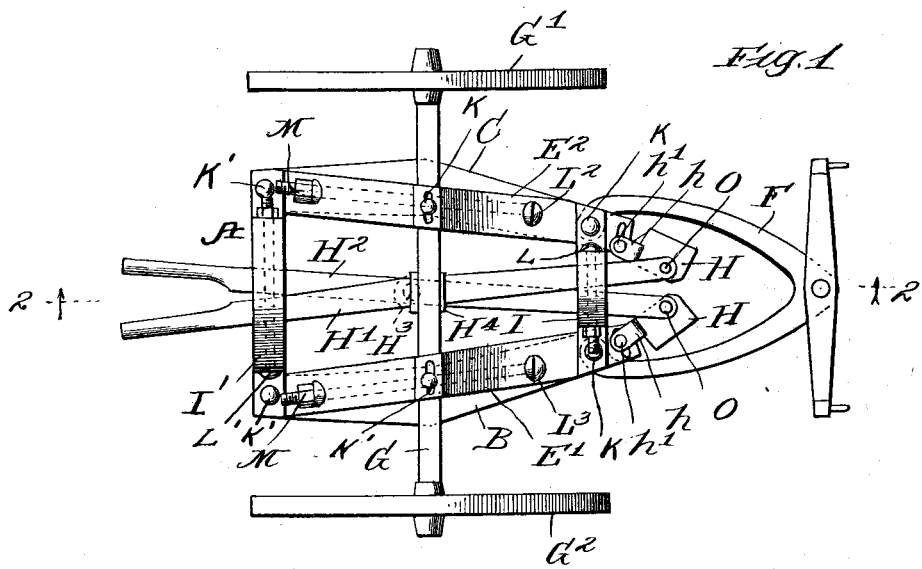
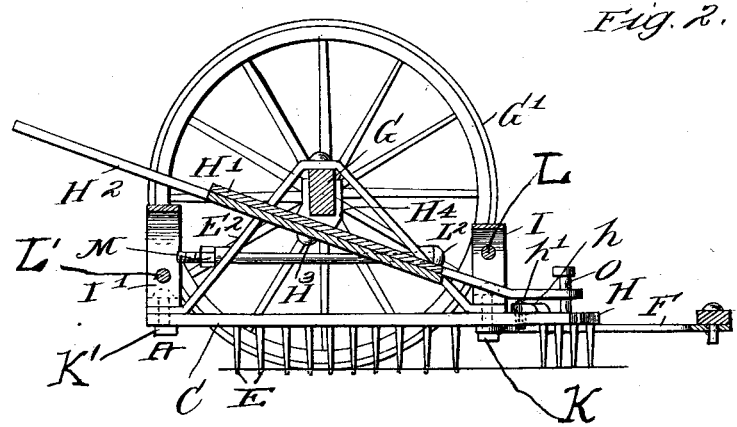
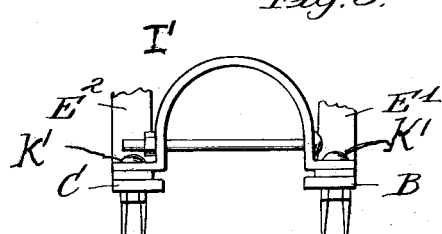
WITNESSES
G. A. Paubenschmidt
G. C. Emerson
INVENTOR
James T. Hill
By Wm H. Bates Attorney

UNITED STATES PATENT OFFICE.

JAMES T. HILL, OF GAINESVILLE, GEORGIA.

ADJUSTABLE HARROW.

1,069,420.  Specification of Letters Patent.  Patented Aug. 5, 1913.

Application filed April 27, 1912. Serial No. 693,767.

*To all whom it may concern:*

Be it known that I, JAMES T. HILL, citizen of the United States, residing at Gainesville, in the county of Hall and State of Georgia, have invented certain new and useful Improvements in Adjustable Harrows, of which the following is a specification.

My invention has relation to improvements in adjustable harrows for cultivating and harrowing around and between the rows of young plants and it has for its object to provide a harrow which will be simple and inexpensive in construction and easily and conveniently operated.

With these and other objects in view the invention consists in the novel construction and combination of parts as will be hereinafter more particularly described and the asserted novelty pointed out in the appended claims.

I have fully and clearly illustrated my invention in the accompanying drawings in which;

Figure 1 is a top or plan view of my harrow. Fig. 2 is a longitudinal vertical section on the line 2—2 of Fig. 1, and Fig. 3 is a detail view of the rear bow and harrow frame.

Similar letters of reference indicate corresponding parts in the several figures.

Referring to the drawings: A designates a harrow frame composed of two sections B and C, each section being provided with a suitable number of harrow teeth E rigidly secured to the under side of said sections. These sections B and C are rigidly secured to the rear and forward ends of inverted V-shaped spring frames $E'$, $E^2$, which are mounted upon and secured at their apices to an axle G carried by the ordinary driving wheels $G'$, $G^2$.

F designates a V-shaped yoke rigidly secured to the forward ends of the harrow frame sections, and to the apex of this yoke is pivotally secured a swingle-tree.

H, H, designate smaller auxiliary harrow frames provided also with teeth and operatively secured to the forward ends of the harrow frame sections B and C through the medium of links $h$, $h$, and pivots $h'$, $h'$, and by means of which the auxiliary harrow frames H, H, are adjusted laterally in conjunction with hand levers $H'$, $H^2$, which are pivotally secured together by means of a pivot $H^3$ and supported to the axle G by means of a bracket $H^4$.

I and $I'$ designate spring steel bows having their ends rigidly secured to the forward and rear ends of the sectional harrow frames B and C. The V-shaped inverted spring frames $E'$, $E^2$, bows I and $I'$, yoke F, and harrow frame sections B and C are bolted together by means of bolts K and $K'$. The front and rear bows are adjustable laterally by means of bolts L and $L'$. The V-shaped inverted spring frames are provided with bolts $L^2$, $L^3$, which are passed through said inverted V-shaped spring frames to provide for the vertical adjustment of the harrow frames, the bolts $L^2$, $L^3$, having upon their rear screw threaded ends nuts M, M. By tightening the bolts the inverted V-shaped spring frames are drawn together thereby raising the harrow frames, and by loosening the bolts the harrow frames are lowered.

To allow for the vertical adjustment of the auxiliary harrows H, H, the hand levers $H'$, $H^2$, at their lower ends are pivotally and operatively secured to vertical bolts O, O, secured to said auxiliary harrow frames.

Having described the construction of my invention in detail in connection with the accompanying drawings the operation thereof will be obvious and further description herein is deemed unnecessary.

What I claim as new and desire to secure by Letters Patent, is:—

1. The combination with a harrow frame composed of two sections, a yoke secured to the forward ends of said sections and carrying a swingle-tree at its apex; of auxiliary adjustable smaller harrow frames pivotally and operatively secured to the forward ends of the two sections of the harrow frame through the medium of link connections, hand levers having their lower ends pivotally and operatively secured to the auxiliary harrow frames, the hand levers being also pivotally connected together centrally of their lengths and mounted in a bracket secured centrally to the axle of the machine, adjustable spring bows fastened to the forward and rear ends of each section of the harrow frame, and bolts passed transversely through said spring bows to provide for the lateral adjustment of the harrow frame.

2. The combination with a harrow frame composed of two sections, a yoke secured to the forward ends of said sections and carrying a swingle-tree at its apex, auxiliary adjustable smaller harrow frames pivotally and operatively secured to the forward ends of the two sections of the harrow frame through the medium of link connections, hand levers having their lower ends pivotally and operatively secured to the auxiliary harrow frames, the said hand levers being also pivotally connected together centrally of their lengths and mounted in a bracket secured centrally to the axle of the machine; of adjustable spring bows fastened to the forward and rear ends of each section of the harrow frame, and bolts passed transversely through said spring bows to provide for the lateral adjustment of the harrow frame.

In testimony whereof I affix my signature in presence of two witnesses.

JAMES T. HILL.

Witnesses:
T. E. ATKINS,
R. J. SANDERS.

Copies of this patent may be obtained for five cents each, by addressing the "Commissioner of Patents, Washington, D. C."